J. B. SCHUMAN.
SHOCK LOADER.
APPLICATION FILED JAN. 10, 1910.
1,031,029.
Patented July 2, 1912.
4 SHEETS—SHEET 4.
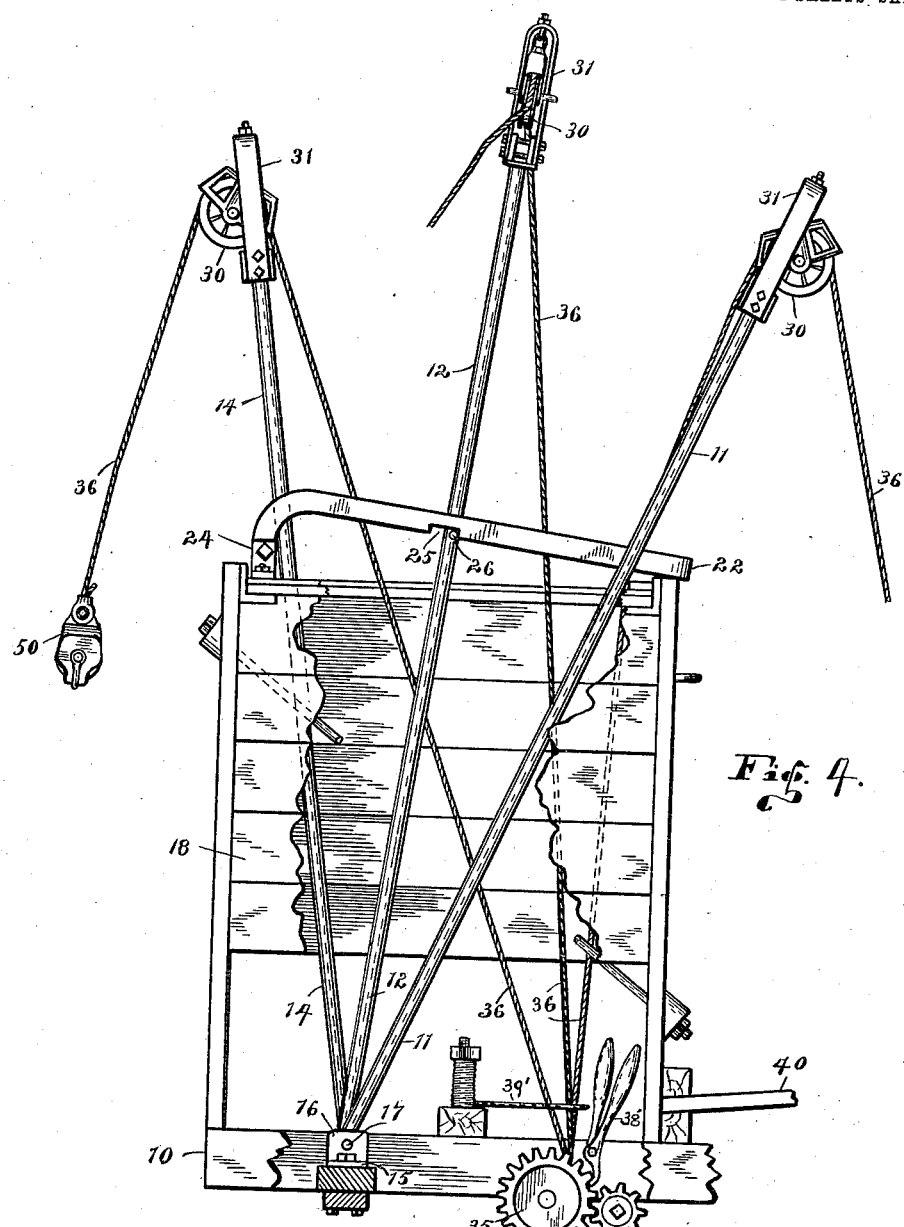
Fig. 4.
Fig. 5.
Witnesses:
Adelaide Kearns
Lee R. Garber
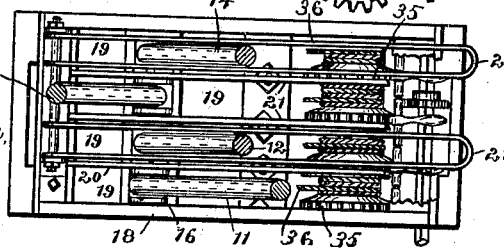
Inventor.
James B. Schuman,
By James A. Walsh,
Attorney.

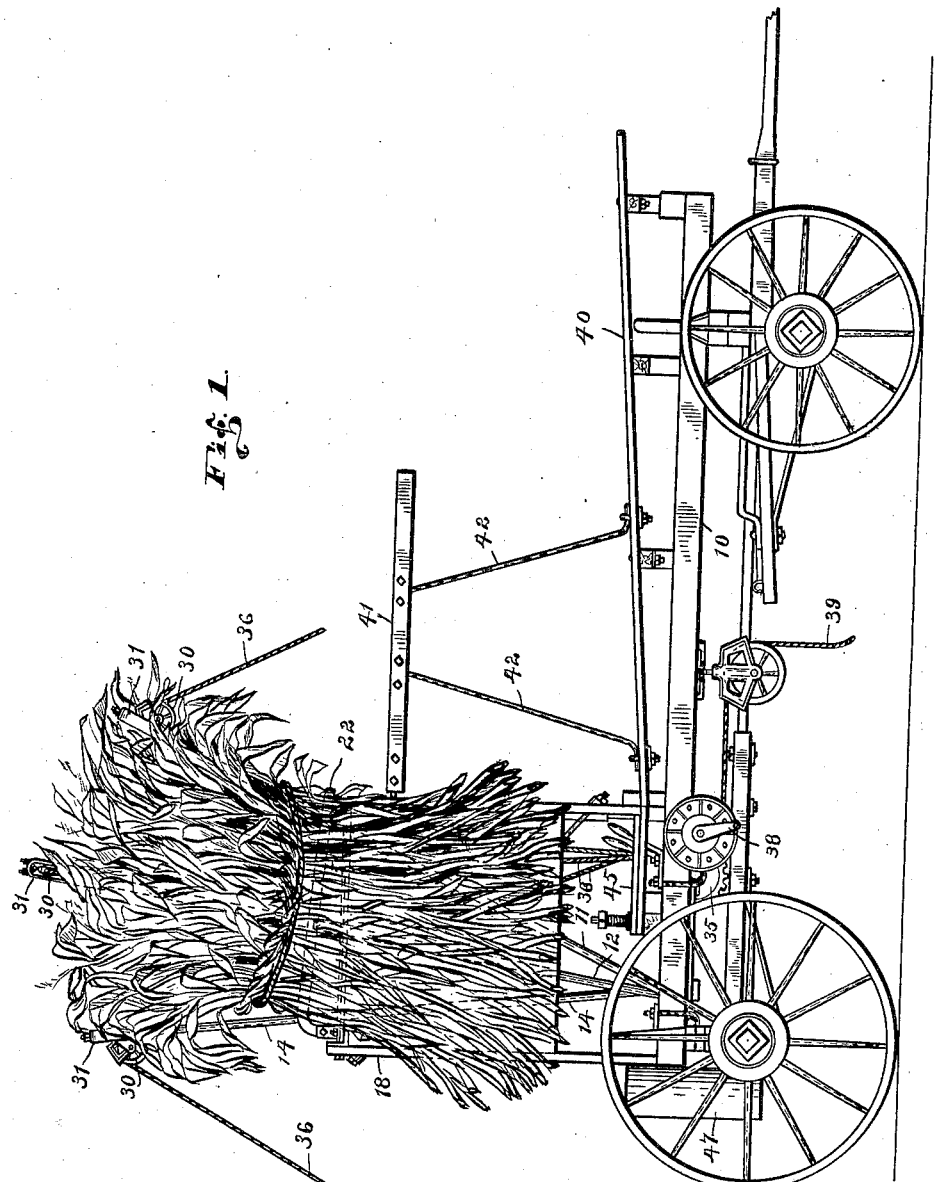

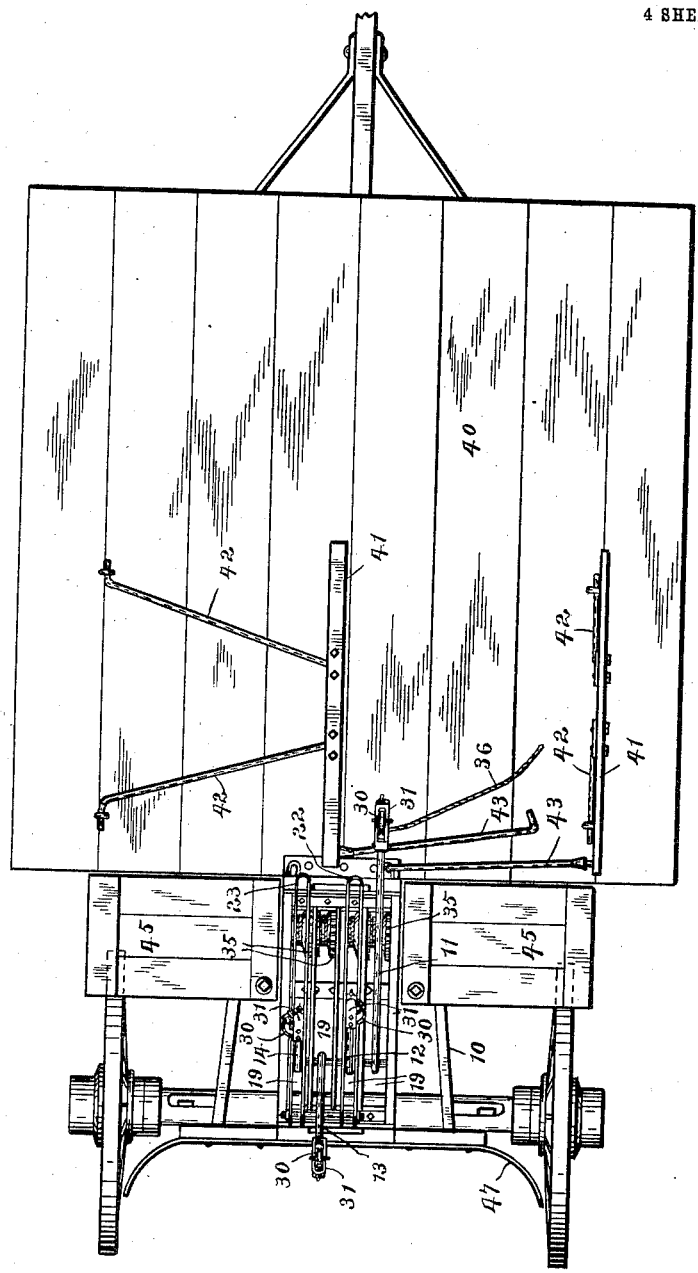

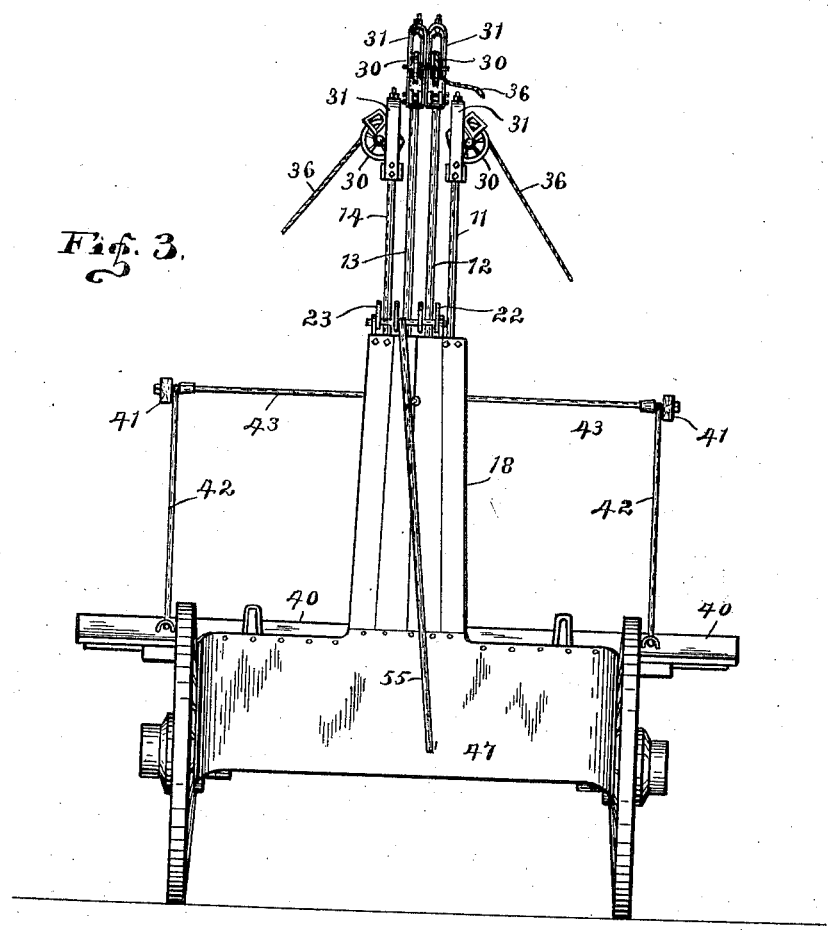
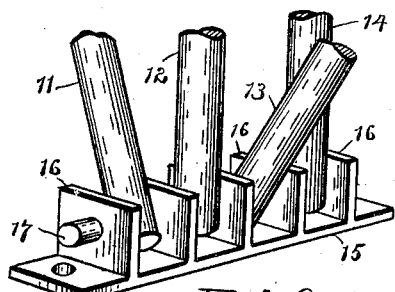
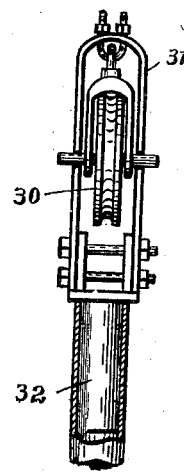

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

SHOCK-LOADER.

1,031,029.   Specification of Letters Patent.   Patented July 2, 1912.

Application filed January 10, 1910.  Serial No. 537,159.

*To all whom it may concern:*

Be it known that I, JAMES B. SCHUMAN, a citizen of the United States, residing at Indianapolis, in the county of Marion and State of Indiana, have invented certain new and useful Improvements in Shock-Loaders, of which the following is a specification.

The object of my invention is to provide a vehicle for conveniently handling shocks of corn, especially adapted for removing such shocks as units from the field, transporting, and depositing the same in upright position at destination to be shredded, and upon which vehicle they may also, as desired, be readily parted into several portions to be distributed in pastures, cattle yards or otherwise for cattle food.

In the accompanying drawings, which are made a part hereof, Figure 1 is a side elevation of my improved loader showing a corn shock attached thereto; Fig. 2 a plan of said loader; Fig. 3 a rear elevation; Fig. 4 a side elevation partially in fragment of a portion of said loader; and Figs. 5, 6 and 7 detail views of parts of the loader.

Said invention comprises a suitable vehicle, 10, upon which I pivotally mount a number of shock lifting posts, 11, 12, 13, 14, preferably in series in a container, 15, provided with partitions, 16, between which said posts stand, and all of which may be pivotally connected by a single pin, 17, and independently shifted, as indicated most plainly in Fig. 6, but, as will be readily understood, any suitable arrangement for this purpose may be employed. Said posts extend upwardly through a casing, 18, or other suitable framework, and preferably move through guideways, 19, the guideway for post 11 being formed by the side of the casing and rod, 20, and that for post 13 formed by the rods, 21. The movement of posts 12 and 14, respectively, is controlled by loops, 22, 23, which are pivotally mounted at one of their ends to casing 18, as indicated at 24, and are provided with recessed portions, 25, for holding said posts perpendicularly by means of stops or pins, 26, which engage in said recessed portions.

Each of the shock posts at its upper end is provided with a cable-guide, 30, mounted in a frame, 31, the lower end 32 of which frame extends into the post so that it may swivel therein.

Preferably adjacent the lower ends of the shock posts I provide a series of drums, 35, one for each post, upon each of which drums is wound a cable, 36, which is led up and over cable guide 30. Said system of drums is provided with suitable operating mechanism, but as it forms no part of my present invention the construction and operation thereof will not be described specifically herein further than to state that said drums may be rotated manually by a crank, 38, or animal power may be applied to cable, 39, for that purpose, and each of which drums is controlled by a lever, 38', which may be held from engagement therewith by contact with a spring arm 39'.

On the vehicle body I provide a spacious platform, 40, upon each side of which I pivotally mount guards, 41, by means of swinging links, 42, which guards may lie inwardly or outwardly on said platform or be brought to upright position and held in comparatively rigid position by means of keepers, 43, pivoted thereto and hooked or otherwise attached to a portion of the loader. At the rear of said platform I provide adjustable doors, 45, which may be shifted so that access may be had to the mechanism beneath, all as indicated in Fig. 2. At the rear of the loader, preferably between the rear wheels thereof, I provide a concave shock retainer 47, which guides the elevated shocks toward the middle of the loader.

In operation, my improved shock loader is drawn to a shock, and one of the posts, as 11, is swung rearwardly so that its cable, provided with a shock grapple, 50, hangs out at the rear of the loader. During this operation an appropriate drum 35 is released to enable the operator to pull out cable 36 and encircle and grapple a shock therewith, after which the drum is rotated, by manual or animal power as heretofore indicated, and the continued rotation of the winding drum shortens the cable and draws the shock against the shock retainer 47 and upwardly until the rotation of the drum is discontinued. The shock is then suspended near the side of casing 18, and slight lateral pressure thereagainst will cause cable-guide 30 to swivel toward the side of the casing, at the same time carrying the shock in the same direction, which latter because of its weight and swinging motion throws post 11 forwardly and into the position shown in Fig. 4, and which forward swinging movement throws the shock around in front of said casing where it may be deposited on the platform 40. Before this operation, however, the guard 41 on that side of the vehicle through which the shock travels is swung outwardly over the edge of the platform, and, when the shock is deposited, said guard is brought to upright position to insure retention of the shock on the platform after it has been released from the cable. Post 12 is then brought to the rearward position, similarly to post 11, and when a shock is secured thereto and elevated it is thrust sidewise in the manner just described, which causes it to swing in the same direction as the previous shock, but when said post moves to substantially perpendicular position the same is stopped by contact of pin 26 in the recessed portion 25 of its guiding loop 22, Fig. 4. These loops, as will be readily understood, being pivotally mounted, automatically contact with said pins during the movement of the posts, and when it is desired to release a post from this engagement it is but necessary to raise the loop at its forward end. When post 12 is locked in the position just described, and as indicated in Fig. 4, the shock suspended thereby is retained on the side of the casing. Post 14 is controlled by loop 23 substantially in the manner as post 12, and is thrown rearwardly and operated in the same way, and carries its shock to the opposite side of the casing and there sustains it, while post 13, which is similarly operated as post 11, is thrown rearwardly and sustains its shock at the rear of casing 15. In this manner I may make a load of four shocks, one of which is suspended above or on the platform ready to be torn apart and distributed from the platform. After the shock attached to post 11 has been disposed of, post 12 is released from engagement with loop 22 by simply raising the forward end of the latter, which causes said post with its shock to swing forward and said shock to be deposited upon the platform in like manner as the first shock, and likewise the other posts are manipulated to deliver their respective shocks on said platform. While I specifically state that four shocks may be thus handled it will be understood that several may be deposited upon the platform, and others suspended from the posts as hereinbefore indicated. As a convenient means for shifting the shocks from the rear to the side of the casing 15 I employ a bar, 55, flexibly connected to said casing, so that it may be brought to any desired position under a shock to be used as a lever for moving the shock to the side of the casing.

In the manner thus described I am enabled to readily remove one or several corn shocks from a field intact and transport the same to a pasture or other desired place, where one or more may be quickly placed in position on the platform to be divided into suitable portions and distributed as desired; or when it is desired to haul shocks to a shredder to be re-deposited upon the ground each of the shock-posts with its shock may be shifted rearwardly and the shock shifted rearwardly into upright position ready for removal at any convenient time. By thus removing whole shocks as units the field is left clean, as the grappling cable binds a shock in such manner that the fodder does not become scattered while being elevated or *en route*, and much time and labor in thus handling fodder is saved, as it has been the common practice to tear corn shocks apart in the field and load the loose fodder into box wagons by hand, which is not only a slow and laborious method but results in the loss of much valuable fodder by being blown about and scattered in the field and lost from the wagons in hauling.

From the foregoing description and the drawings it will be understood that I am enabled to load and unload all the shocks from the rear end of the vehicle, which is advantageous in that the vehicle, whether low or high wheeled, will have no tendency to tip when a shock is being pulled from the earth and elevated; and further, that I provide a compact arrangement for the purpose which may be readily applied to ordinary existing handy wagons or racks in general use on farms.

I claim as my invention:

1. A shock loader comprising a portable platform, a plurality of shock posts at one end thereof, means for attaching a shock to each of said posts, means for elevating said shock, means permitting said shock-posts to be independently swung forwardly to deposit shocks on said platform, and an adjustable guard associated with said platform for retaining shocks thereon.

2. A shock loader comprising a platform, shock-posts pivotally mounted at one end of said platform, guides through which said posts swing forwardly and rearwardly, a cable guide at the upper end of said posts, a cable passing over said cable-guides to encircle a shock, and means for winding said cable to elevate said shock.

3. In a shock loader, a shock-post container, means for pivotally connecting the lower end of a shock-post therein, a swiveling cable-guide in the upper end of said post, a shock encircling and elevating cable mounted in said guide, and means for operating said cable.

4. In a shock loader, a shock-post container, a shock-post, means for connecting said post to said container, a guide through which said post is shifted, a swiveling cable-guide mounted in said post, a shock encircling and elevating cable mounted in said guide, and means for operating said cable.

5. In a shock loader, a rearwardly and forwardly shiftable pivotally mounted shock-post, an automatically acting guide through which said post is shifted, and means for attaching a shock to and suspending the same from said post.

6. A shock loader comprising a casing, shock-posts movably mounted therein, means for guiding said posts in their movements, means associated with said posts for suspending shocks therefrom, and means for operating said suspending means.

7. A shock loader comprising a platform, a casing at one end thereof, a shock-retainer adjacent said casing, a shock-post in said casing, a cable-guide in said post, a cable passing over said guide and adapted to encircle a shock distant from said loader, and means for operating said cable to draw said shock within said retainer and suspend the same.

8. A shock loading vehicle comprising a casing, shock suspending and shifting means mounted in said casing, means for sustaining a shock from said shifting means, and means permitting said shifting means to swing forwardly to deposit a shock on said platform.

9. A shock loader comprising a platform, a casing at the rear end thereof, and a plurality of rearwardly and forwardly movable shock-posts in said casing adapted to sustain shocks at opposite sides of said casing and shift the same forwardly to said platform.

10. A shock loader comprising a portable platform, a plurality of rearwardly and forwardly adjustable shock-posts associated therewith, means associated with each of said posts for attaching a shock thereto, and means for elevating said shocks to be swung onto said platform by the movement of said posts.

11. The combination, with a vehicle, of a plurality of rearwardly and forwardly adjustable shock-posts mounted thereon, means associated with each of said posts for grappling a shock, and means for actuating said grappling means to elevate a shock at the rear end of and to be shifted forwardly over said vehicle.

12. In a shock loader comprising a portable platform and means for elevating and depositing shocks thereon, a shock guard associated with said platform adapted to be adjusted out of the path of the shock when being loaded and adjusted to guarding position when said shock has been deposited.

13. In a shock loader, a portable platform, means for elevating and depositing shocks thereon, an adjustable guard comprising a link and a guarding member, and means for maintaining said guard in position to retain a shock on said platform.

14. In a shock loader, a portable platform, a shock-post container associated therewith, a rearwardly and forwardly movable substantially vertically arranged shock-post in said container, and a guide through which said post shifts adjustably mounted on said container to maintain said post in substantially vertical position.

15. A shock-loader comprising a portable platform, rearwardly and forwardly movable shock-posts associated therewith, guides through which said posts are shifted, cable-guides mounted on said posts, a shock encircling and elevating cable supported by said cable-guides, means for operating said cables, and adjustable guards on said platform to retain shocks thereon.

In testimony whereof I affix my signature in presence of two witnesses.

JAMES B. SCHUMAN.

Witnesses:
JOSEPH K. SHARPE, Jr.,
WALTER J. TINGLE.

---

Copies of this patent may be obtained for five cents each, by addressing the "Commissioner of Patents, Washington, D. C."